US012725511B2

(12) United States Patent
Beuchert et al.

(10) Patent No.: US 12,725,511 B2
(45) Date of Patent: Sep. 1, 2026

(54) SAFETY SYSTEM

(71) Applicant: Caljan A/S, Hasselager (DK)

(72) Inventors: Karsten Beuchert, Hedensted (DK); Anders Ørgaard Kloster, Skødstrup (DK)

(73) Assignee: Caljan A/S, Hasselager (DK)

( * ) Notice: Subject to any disclaimer, the term of this patent is extended or adjusted under 35 U.S.C. 154(b) by 0 days.

(21) Appl. No.: 18/825,015

(22) Filed: Sep. 5, 2024

(65) Prior Publication Data

US 2025/0078646 A1 Mar. 6, 2025

(30) Foreign Application Priority Data

Sep. 6, 2023 (DK) ........................... PA 2023 70461

(51) Int. Cl.

| | |
|---|---|
| ***G08B 29/00*** | (2006.01) |
| ***G08B 21/02*** | (2006.01) |
| ***G08B 21/18*** | (2006.01) |

(52) U.S. Cl.

CPC ............. *G08B 29/00* (2013.01); *G08B 21/02* (2013.01); *G08B 21/18* (2013.01)

(58) Field of Classification Search

CPC . A61B 5/02438; A61B 5/14551; A61B 5/681; A61B 5/0022; A61B 5/0205; A61B 2560/0228; A61B 5/0261; A61B 5/282; A61B 5/291; A61B 5/366; A61B 5/6803; A61B 5/7203; A61B 5/721; A61B 5/7221; A61B 5/7264; A61B 5/7275; A61B 5/7282; A61B 5/746; A61B 5/7475; A61B 2562/0219; A61B 5/02055; A61B 2560/0252; A61B 5/0024; A61B 5/01; A61B 5/021; A61B 5/02416;

(Continued)

(56) References Cited

U.S. PATENT DOCUMENTS

| | | | | |
|---|---|---|---|---|
| 3,292,568 A | | 12/1966 | Morrell | |
| 4,063,627 A | * | 12/1977 | Wright | F15C 3/04 60/407 |

(Continued)

FOREIGN PATENT DOCUMENTS

| | | |
|---|---|---|
| CN | 105947594 A | 9/2016 |
| CN | 205906629 U | 1/2017 |
| WO | 2020/113179 A1 | 6/2020 |

OTHER PUBLICATIONS

European Search Report for Application No. 24 19 8401 issued on Feb. 12, 2025.

Danish Search Report for PA 2023 70461 issued Mar. 15, 2024.

*Primary Examiner* — Daniel Previl

(74) *Attorney, Agent, or Firm* — Schmeiser Olsen PLLC

(57) ABSTRACT

A safety system comprising a number of sensors connected to a control box is provided, where the status of the system is displayed on the control box by a plurality of indicators in two categories, where the system may be in three modes, wherein in a first mode all indicators in a first category are "on" indicating that a machine on which the safety system is arranged is in operation mode, a second mode where all indicators in the second category are "on" indicating that the machine on which the safety system is arranged is in service mode and a third mode where all indicators are "off" for both categories indicating that the machine on which the safety system is arranged is not being tested by the safety system.

11 Claims, 3 Drawing Sheets

(58) Field of Classification Search

CPC ... A61B 5/0245; A61B 5/0533; A61B 5/0816; A61B 5/1112; A61B 5/1118; A61B 5/257; A61B 5/332; A61B 5/369; A61B 5/389; A61B 5/398; A61B 5/4809; A61B 5/4812; A61B 5/4815; A61B 5/4818; A61B 5/4857; A61B 5/6814; A61B 5/6824; A61B 5/7455; A61B 5/6806; A61B 5/1114; A61B 5/1123; A61B 5/6805; A61B 5/6895; A61B 5/742; A61B 5/0006; A61B 5/0008; A61B 5/0013; A61B 5/002; A61B 5/0077; A61B 5/053; A61B 5/1116; A61B 5/1117; A61B 5/318; A61B 5/384; A61B 5/395; A61B 5/6807; A61B 5/6826; A61B 5/6891; A61B 7/00; A61B 7/04; A61B 7/045; A61B 8/00; A61B 8/06; A61B 8/0808; A61B 8/4427; A61B 8/488; A61B 8/565; G16H 40/63; G16H 40/67; G16H 20/30; G16H 50/20; G16H 15/00; G16H 20/13; G16H 80/00; G01S 17/10; G01S 17/36; G01S 17/86; G01S 17/894; G01S 17/931; G01S 7/4811; G01S 7/4815; G01S 7/4816; G01S 7/4817; G01S 7/484; G01S 7/4863; G01S 7/4914; G06Q 30/0201; G06Q 10/06; G06Q 10/06316; G06Q 10/0637; G06Q 10/06375; G06Q 10/06393; G06Q 10/101; G06Q 10/103; G06Q 30/018; G06Q 30/0251; G06Q 30/0282; G06Q 30/06; G06Q 50/205; G06Q 50/2053; G06Q 50/2057; G06Q 50/22; G06Q 50/34; G07C 13/00; G07C 2009/00968; G07C 9/00174; G07C 9/00738; H04L 61/10; H04L 61/4511; H04L 43/0811; H04L 43/0852; H04L 43/10; H04L 43/50; H04L 63/08; H04N 25/773; H10F 39/182; H10F 39/184; H10F 39/191; A47L 11/4008; G01R 33/072; G05B 19/188; G05B 19/4083; G05B 19/418; G05B 2219/31372; G05B 2219/33192; G05B 19/406; G05B 9/02; G06F 11/1438; G06F 11/1441; G06F 16/00; G06F 16/9538; G06F 16/9577; G06F 21/575; G06F 9/4418; G06N 3/0464; G06N 3/08; G06N 3/09; G06N 3/092; G06N 3/0985; G06N 7/04; G07F 17/32; G07F 17/3234; G07F 17/3262; H01H 36/008; Y02P 90/80; Y10T 70/7057; Y10T 70/7073; Y10T 70/7079; Y10T 70/7904; A63B 2102/32; A63B 24/0003; A63B 24/0075; G08B 21/02; G08B 21/0423; G08B 21/0446; G08B 21/0453; G08B 21/0461; G08B 21/0476; G08B 21/0484; G08B 21/0492; G08B 21/18; G08B 25/016; G08B 29/00; A43B 3/42; A43B 3/46; A43B 3/48; C07D 285/14; C07D 417/10; G01N 21/64; G01N 33/948; G16Z 99/00; H04M 2250/12; H04M 3/5116; H04W 84/18

USPC ....... 340/514, 525, 504, 500, 501, 503, 508, 340/511, 521, 524, 479, 467, 516, 507, 340/539.24

See application file for complete search history.

(56) References Cited

U.S. PATENT DOCUMENTS

| | | | | | |
|---|---|---|---|---|---|
| 4,608,488 | A * | 8/1986 | Hirose | G07F 7/02 | 700/84 |
| 4,675,654 | A * | 6/1987 | Copeland | G08B 23/00 | 340/461 |
| 2002/0105423 | A1* | 8/2002 | Rast | G08G 1/162 | 340/467 |
| 2007/0220324 | A1* | 9/2007 | Covi | G06F 1/30 | 714/14 |
| 2010/0075751 | A1* | 3/2010 | Garvey | G07F 17/32 | 463/43 |
| 2013/0079973 | A1* | 3/2013 | Mohamed | G08G 1/205 | 701/32.2 |
| 2020/0173894 | A1 | 6/2020 | Pope et al. | | |
| 2021/0048799 | A1* | 2/2021 | Haapamaki | G05B 9/02 | |
| 2023/0106122 | A1 | 4/2023 | Peterson et al. | | |

* cited by examiner

SAFETY SYSTEM

CROSS-REFERENCE TO RELATED APPLICATIONS

This application claims priority to Danish Application No. PA 2023 70461, having a filing date of Sep. 6, 2023, the entire contents which are hereby incorporated by reference.

FIELD OF TECHNOLOGY

The following is directed at a safety system, particularly for use when servicing certain types of apparatus. Further, the following is directed to be used with apparatus comprising hydraulic or pneumatic systems.

BACKGROUND

In embodiments the systems may be pumps associated with drives, rams, actuators and other components which in use are used for manipulating at least part of the apparatus in which they are integrated. As an example, some apparatuses are provided with extendable legs. These legs are often extended or withdrawn by the use of hydraulic rams or actuators. One of the advantages of using hydraulic rams or actuators is their ability to exert very large forces with the use of relatively small pumps requiring little energy compared to the forces generated. Such rams/actuators have widespread use in many types of machinery in many different industrious fields.

Embodiments of the present invention will be explained with reference to a specific apparatus. The apparatus in question is an extendable conveyor structure. The conveyor structure comprises a main machine frame on which a number-typically three conveyor sections are arranged. The conveyor sections may be extended relative to each other, such that the length of the resulting conveying length of the conveyor belt may be considerably longer than the length of the conveyor structure when the extendable sections are not in their extended state. The manipulation of the extending sections may be effected by actuators pushing or pulling a specific section relative to the main machine frame. Alternatively, chains attached to each section travelling over sprocket wheels may effect the movement by rotating the sprocket wheel-often either by an electromechanical construction (an electrical motor in combination with a gearbox) or a hydraulically driven gearbox in connection with the axle on which the sprocket wheels are mounted.

Furthermore, the main machine frame may be carried on extendable legs, such that the conveyor or at least some sections may be arranged in a desired height above a support surface—typically a floor. These extendable legs may be operated by activating hydraulic rams or actuators.

In this manner it is possible to operate an extendable conveyor structure by manipulating various hydraulic devices (rams, actuators, pumps etc.). Hydraulic means are often chosen over for example pneumatic means for example to minimize noise (pneumatic means tends to generate loud noises when releasing pressure), offer better control and carry larger loads for smaller constructions.

One problem arises when it is necessary to service these types of devices where parts of the machinery depend on activation means in the shape of, for example, hydraulic means. In order to service or repair such machinery the hydraulic systems are turned off. In this situation a hydraulic ram depends on embodiments of the system to maintain the pressure in order to remain in its position. Particularly if the hydraulic system is being serviced there is a chance that the hydraulic either intentionally or worse unintentionally may be released, whereby the ram loses its pressure and may subtract/collapse. Such a situation may create a very dangerous scenario for anybody working inside or around the machine.

SUMMARY

An aspect relates to a system, which may be installed in any type of machine/apparatus for clearly indicating the status of the apparatus.

An aspect relates to a safety system which alleviates or at least severely minimizes these dangers.

Embodiments of the present invention address this by providing a safety system comprising a number of sensors connected to a control box, where the status of embodiments of the system is displayed on the control box by a plurality of indicators in two categories, where embodiments of the system may be in three modes, wherein in a first mode all indicators in a first category are “on” indicating that a machine on which the safety system is arranged is in operation mode, a second mode where all indicators in the second category are “on” indicating that the machine on which the safety system is arranged is in service mode and a third mode where all indicators are “off” for both categories indicating that the machine on which the safety system is arranged is not being tested by the safety system.

By providing sensors on all critical points where movement of the machine or parts of the machine may occur or be initiated and connecting these sensors to a central control box with a very simple display (for example a green light “on” or “off”) the operators “checklist” is simplified. If the machine is to undergo a service, the operator or service personnel have to make certain that all indicators on the control box in the service category are “on” before any work may be undertaken. Likewise, before the machine may be started up again, all indicators in the “operation mode” must be “on”. For both situations it will be clear from the indications on the control box if it is safe to commence service, or the machine is ready for operation.

Depending on the type of machine/machinery embodiments of the system is applied to the sensors may be selected accordingly. In some instances, thermocouples, strain gauges, Hall-sensors, pressure states, simple on/off relays etc. may be selected.

In an embodiment the safety system is mounted on an apparatus and one or more of the sensors are connected to one or more legs, which one or more legs may be in a non-active position not supporting the apparatus and an active position supporting the apparatus, where when the legs is in the active position a corresponding indicator on the control box may indicate “on” in service mode, and when the one or more legs are in the “on” active position a corresponding indicator on the control box may indicate “on” in operation mode.

Some types of apparatus are provided with hydraulic telescoping legs, in order to be able to alter their elevation, tilt etc. These hydraulic legs depend on a hydraulic pressure to remain at the desired level or increased/decreased pressure to change the height/elevation. When such an apparatus needs to be serviced, a malfunction in the hydraulic system may have serious implications for a service person working inside or having for example an arm inside the machine, if/when the hydraulic pressure disappears, and the machine may collapse on that person. By providing legs, it will be possible to lower/elevate the machine such that the legs may be rotated into an active state, where the entire machine is resting solely on the legs and not on the hydraulic legs, any failure in the hydraulic system will not cause any unintended lowering of the machine. The legs may be rotated manually by the service personnel and the machine lowered. Once the legs are rotated into the correct position, the sensors will detect this. If, for example, four legs are arranged on the machine each leg have a sensor which generates an input once the leg is in the correct position ready to support the machine. In this situation the control box may generate an “on” indicator on the control box, indicating that the legs are in place. Until this happens the indicator will remain “off” clearly indicating that care needs to be taken.

Alternatively, each legs sensor may be provided with a separate indicator on the control box. This obviously makes it easier for the operator to precisely know which legs have been engaged correctly and which legs needs to be inspected/controlled.

In an embodiment the safety system is mounted on an apparatus comprising a hydraulic system and where one or more of the sensors are connected to the hydraulic system, where the one or more sensors are adapted to register one or more of the following: hydraulic liquid pressure, status of a hydraulic pump, electrical current on the hydraulic pumps motor; and if one or more of the hydraulic liquid pressure, status of the hydraulic pump and/or electrical current on the hydraulic pumps motor corresponds to a predefined state, an input is generated and forwarded to the control box, where depending on the predefined state one or more indicators are turned “on” either in service mode or operation mode, depending on the predefined state.

The sensors used in the hydraulic system may typically be pressure sensors, and the current (or lack of) may be registered by a Hall-sensor arranged proximate the power cables.

In an embodiment the safety system is mounted on an apparatus where a safety barrier is provided suspended between the lower periphery of the apparatus and a surface on which the apparatus rests, and where one or more sensors are arranged on one or more points where the safety barrier is fastened to the surface, such that if the safety barrier is disengaged from the fastening to the surface an input is generated and forwarded to the control box.

Typically, the safety barrier, which may be in the shape of a net is arranged such that items/objects handled by the apparatus, which by mistake may exit the apparatus and land on the surrounding surface is not accidentally positioned below the apparatus. If an item/object by a mishap could end up below/under the apparatus, a worker may enter the space beneath the apparatus and thereby come in danger of injury should the apparatus unintentionally or suddenly move without the operator paying attention to the presence of a person in the vicinity of the apparatus.

As in other embodiments mentioned above the sensors assures that the safety barrier is in place during operation and that the safety barrier may only be removed once the apparatus enters the service mode.

In an embodiment of the invention if the indicators on the control box relating to the service mode are not all indicating “on”, an alarm is generated if a sensor registers and generate an input to the control box that the safety barrier is disengaged from the fastening to the surface and still further that an input is generated to the control box when all sensors arranged on points where the safety barrier is fastened to the surface, registers that the barrier is fastened to the surface, whereby an indicator relating to the status of the safety barrier on the control box indicates that in operation mode is on.

This is to further improve the security, such that access is not granted to areas under the apparatus before the apparatus has fully entered into service mode.

In an embodiment the safety system is mounted on an apparatus, where the apparatus includes one or more extendable members, which extendable members may be in a non-extended position and an extended position, and where locking means are provided for locking the extendable members in the extended or non-extended position, and where a sensor is provided for each of the locking means, such that an input is generated from each sensor of the locking means transmitted to the control box, where the control box has an indicator for each of the locking means both in the service mode and the operation mode, such that when all sensors of the locking means are on in the service mode, all locking means are engaged with the extendable members, and when all indicators are on in the operation mode all locking means are disengaged from the extendable members.

For all embodiments above, a further embodiment may be that one or more sensors are mounted on any powerline supplying power to the machine, such that each of the one or more sensors is connected to the control box and optionally separate indicators on the control box, where when all of the one or more sensors forwards an input to the control box indicate that no power is supplied to the machine, an indicator in the service mode is “on”, and when all of the one or more sensors forwards an input to the control box indicate that power is supplied to the machine, an indicator in the operation mode is “on”.

It is believed that with this safety system or embodiments of the safety system as described above, being independent from the apparatus on which it is mounted, will provide an intuitive and easy to operate system, adding a significant layer of security, particularly in the service situation, where persons may be present in or closely around the apparatus handling parts of the apparatus.

BRIEF DESCRIPTION

Some of the embodiments will be described in detail, with references to the following Figures, wherein like designations denote like members, wherein.

DETAILED DESCRIPTION

Figure 1:
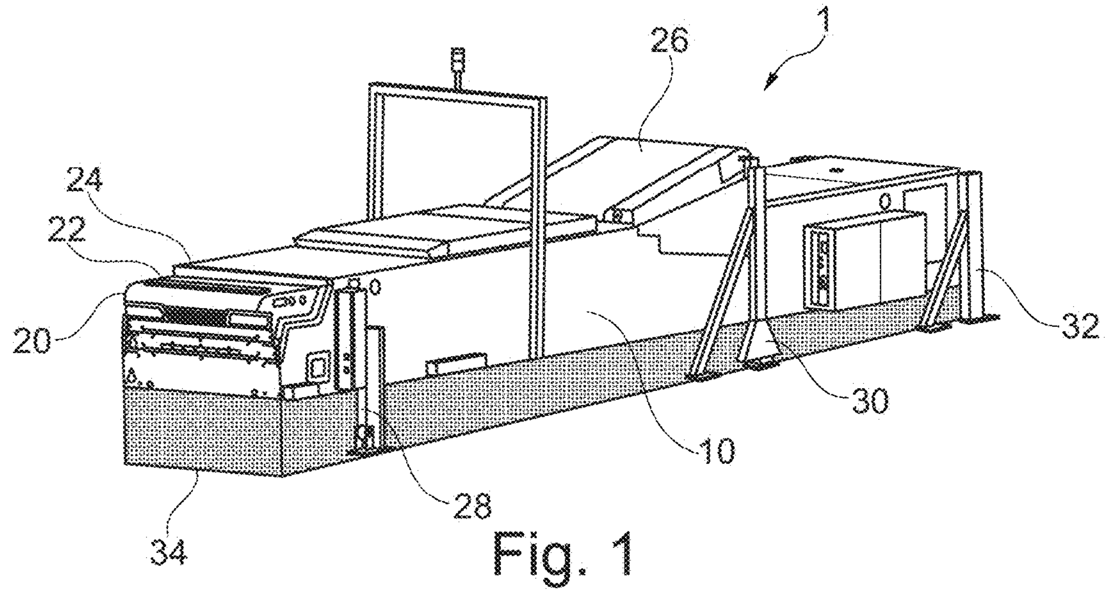
FIG. 1 illustrates an example of an apparatus on which a safety system according to the embodiments of the present invention is installed.

In FIG. 1 is illustrated an example of an apparatus on which a safety system according to embodiments of the present invention may be installed. The apparatus is a conveyor 1 comprising a main section 10 including a main structural frame (not visible). Furthermore, a number of extendable conveyor sections 20,22,24 are arranged for extension relative to the main frame. Also, a conveyor section suitable to alter elevation/inclination 26 is provided. The conveyor is arranged on supports 28, 30,32 which includes hydraulic rams such that the elevation of the conveyor, particularly the main section 10, and various conveyors 20,22,24,26 may be adjusted to achieve a desired elevation.

In the illustrated example in FIG. 1 the conveyor is in an elevated state, i.e. elevated above a floor surface. In order to assure that packages or other items/objects transported on the conveyor or other structures in the vicinity, does not fall below and under the conveyor 1 a barrier 34 is arranged underneath the conveyor 1.

Figure 2:
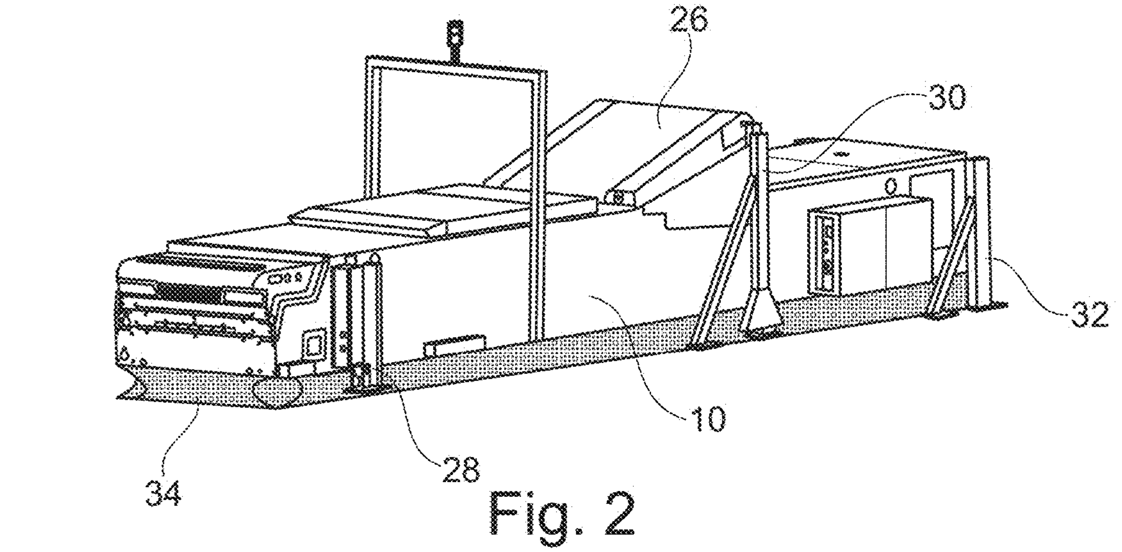
FIG. 2 illustrates the apparatus where the conveyor has been lowered, by retracting the hydraulic rams.

In FIG. 2 the conveyor 1 has been lowered by retracting the hydraulic rams (28,30,32). The elevated conveyor 26 is maintained with a desired inclination. As indicated the barrier 34 has deformed but is still hindering access to the space underneath the conveyor 1.

Figure 3:
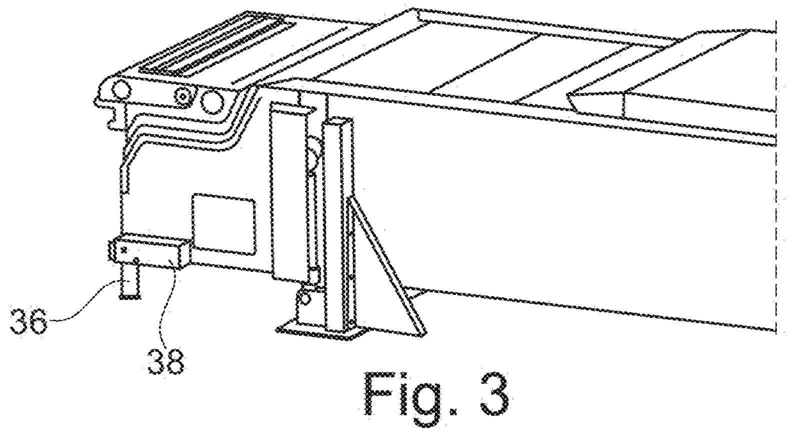
FIG. 3 illustrates a support leg.

Embodiments of the present invention provide a system for added security for apparatus such as for example a conveyor as illustrated and introduced above. The security system as already discussed above provides an extra layer of security, when work (repairs, maintenance or the like) is to be performed on the apparatus. In embodiments, the system requires that additional sensors or means are installed on the apparatus. For example, in FIG. 3 a support leg 36 is illustrated. The support leg may be in an inactive state, folded up along the underside of the apparatus and an activated state, as illustrated, where the support leg 36 will (together with further support legs—not illustrated, distributed underneath the apparatus) carry the apparatus when the hydraulic rams are relieved. The support legs 36 are provided with a small sensor box 38. The sensor box 38 contains sensor means registering the position of the leg. The sensor means may for example be a micro-switch (not illustrated), where the micro-switch provides input to a control box (see FIG. 5). The micro-switch is installed such that it will only supply an input to the control box if the support leg 36 is correctly lowered and locked into a position where it will be able to carry the intended load from the apparatus. Alternatively, a pressure sensor may be installed such that when the pressure sensor has registered a minimum pre-determined load applied to the support leg, an input is sent to the control box.

It is clear that other types of sensors may also be implemented in order to detect that the support leg has been brought into a load carrying position, before input is sent to the control box.

Figure 4:
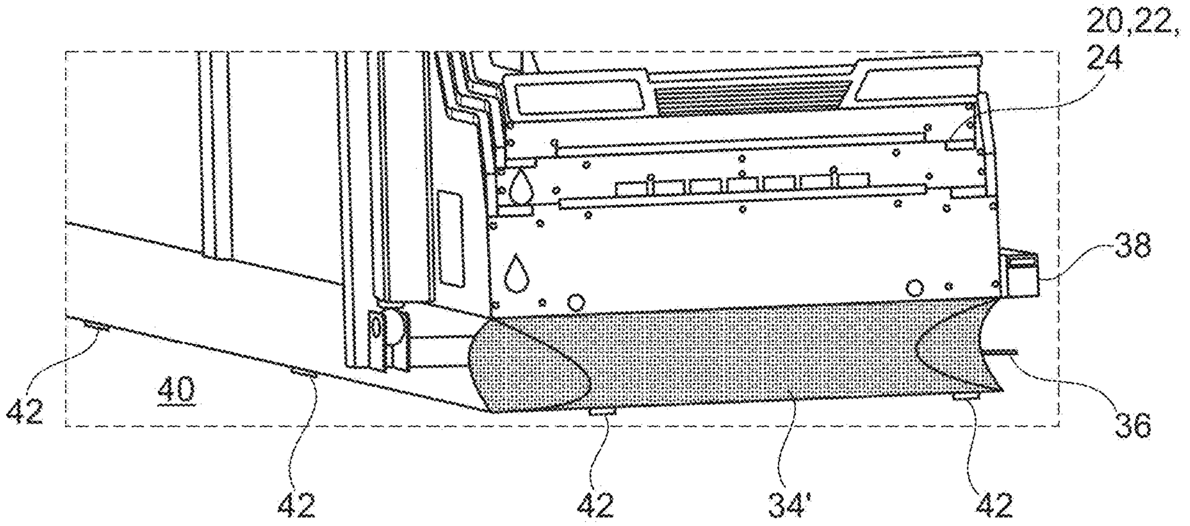
FIG. 4 illustrates a barrier arranged underneath the apparatus.

A further example of a safety measure is illustrated in FIG. 4. As already explained with reference to FIGS. 1 and 2 a barrier 34 may be arranged underneath the apparatus. The barrier in FIG. 4 is illustrated in a state where the apparatus has been lowered, whereby the barrier 34' has bend but still is attached to the floor 40, and the apparatus. The barrier 34 may be attached to the floor, for example in connection points 42. These connection points 42 may comprise a switch or other sensor which indicates whether or not the barrier is securely attached to the connection point 42. This is particularly important when the apparatus is in the operation mode-see further explanation below. The connection points may communicate with the control box such that the correct and safe state of the barrier may be indicated on the control box.

Figure 5:
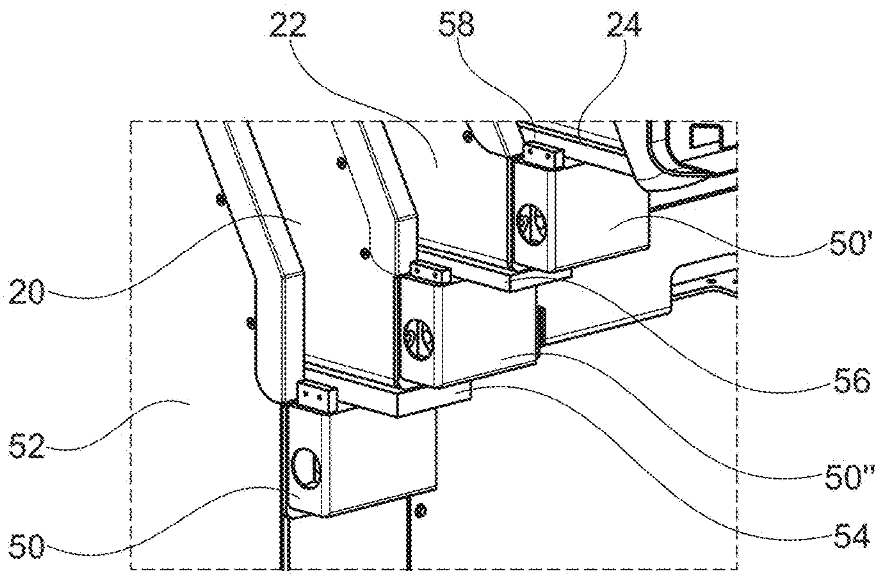
FIG. 5 illustrates an extendable conveyor construction comprising a main frame and three extendable conveyor sections.
Figure 6:
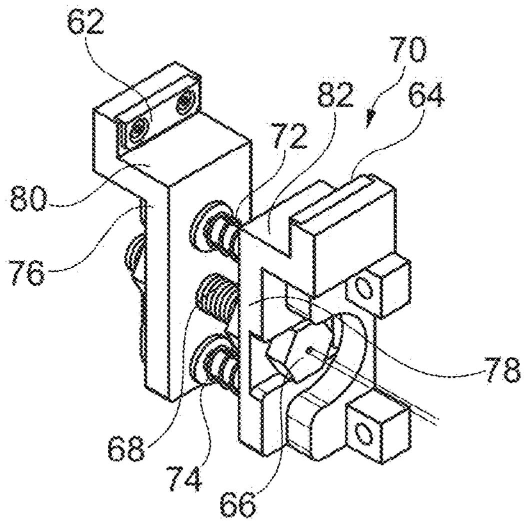
FIG. 6 illustrates an example of a brake shoe.

In FIG. 5 is illustrated a further safety feature. The apparatus in this example comprises three extendable conveyor sections 20,22,24. In order to ensure that the extendable sections does not inadvertently move for example during maintenance or service each extendable conveyor section is provided with a brake shoe enclosed in a housing 50,50',50". An example of a brake shoe is illustrated in FIG. 6.

In FIG. 5 is illustrated an extendable conveyor construction comprising a main frame 52 and three extendable conveyor sections 20,22,24. Each conveyor section 20,22,24 is provided with a slide rail 54,56,58. Adjacent each of the slide rails 54,56,58 is arranged a brake shoe as explained above. The brake shoes are encapsulated in a housing 50,50',50" such that each brake shoe is mounted on an upper part of the extendable conveyor section below, where only the upper flanges with the brake pads 62,64 (see FIG. 6) extends up and may engage the slide rails 54,56,58. The lowermost brake shoe 50 is arranged on the main frame 52 such that the brake pads 62,64 may engage the slide rail 54. In order to activate the brake shoe an aperture is provided in the housing such that the head 66 (see FIG. 6) may be accessed through the aperture in order to activate the brake shoe. Similar arrangements are provided for the other brake shoes 50',50". Consequently, when desiring to carry out maintenance or repair work on the extendable conveyor construction as illustrated in FIG. 1, all the brake shoes 50,50',50" should be tensioned to the desired tension whereby the brake pads 62,64 are gripping an engaging the slide rails 54,56,58 in such a manner that the extendable members 20,22,24 are not able to move relative to each other. After repair work has finished, the brake shoes may be released by counter rotating the bolt 68 thereby taking the tension out of the threaded axles.

By registering the tension in the bolt 68 either as a predetermined torque applied, which assures that the slide rails and thereby the extendable sections are locked or alternatively arranging a strain gauge in the bolt, the tension and thereby the braking force applied to the slide rails may be registered. This tension whether as a torque or an elongation registered by the strain gauge, may be communicated to the control box and be indicated on the display of the control box. In FIG. 6 the brake shoe 70 is further provided with alignment axles 72,74 adapted to guide the travel of the two opposing engagement bodies 76,78 in a linear fashion as dictated by the bolt 66,68. Furthermore support surfaces 80,82 are provided. These support surfaces are designed to support the underside of the slide rails 54,56,58 (see FIG. 5) assuring that the brake shoes are correctly mounted and engaging in correct positions.

Figure 7:
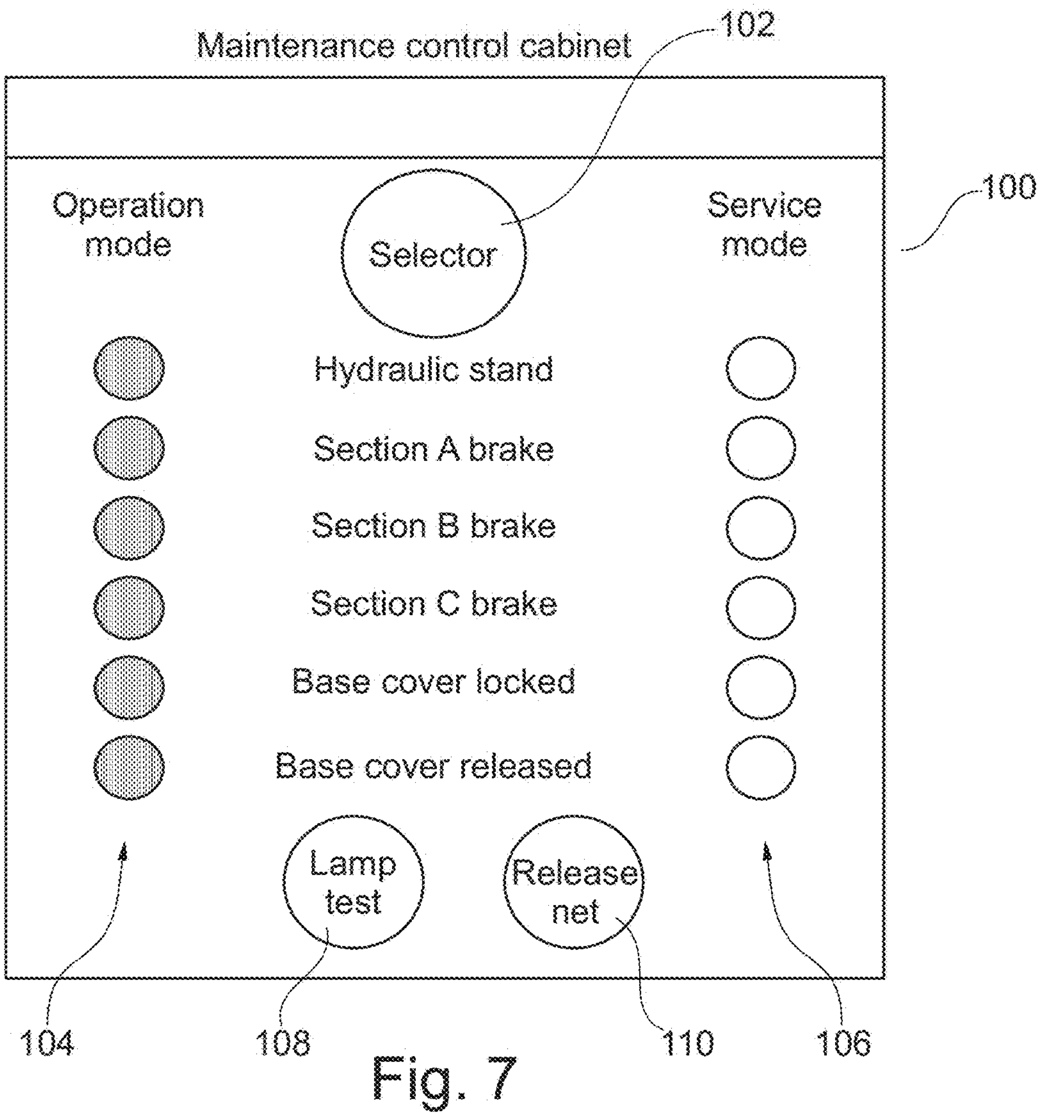
FIG. 7 illustrates an example of a display which may be present on the control box.

In FIG. 7 is illustrated an example of a display 100 which may be present on the control box. The display 100 in this embodiment is provided with a selector 102. The selector is used to determine which state of the apparatus is desired. The state of the apparatus determines how the input from the various sensors is interpreted and presented on the display 100. In this example two modes are selectable: "operation mode" and "service mode". The various sensors, as suggested above provides input to the control box. In this example the sensors applied to the apparatus—the extendable conveyor as illustrated in FIGS. 1 and 2, are sensor for the hydraulic stand being the leg 36, see FIG. 3, brake shoes 50,50',50" (see FIG. 5) arranged for engaging the extendable sections 20,22,24—in the display identified as section A brake, section B brake and section C brake.

A number of LED's are provided in two arrays 104,106. As input is received in the control box the display will illuminate or extinguish the appropriate LED depending on the mode. This routine is pre-programmed in the control box. In the illustrated example "operation mode" is selected (by manipulating the selector). All LED's in the array 104 are illuminated, indicating that the hydraulic stand (the leg 36) is withdrawn as illustrated in FIG. 1, the brakes of all sections are released, and the base cover (barrier 34) is locked in place hindering access under the conveyor.

If the other array 106 of LED's were selected, they should all be illuminated and the other array 104 extinguished.

It is clear that for personnel either operating the apparatus or tasked with service or maintenance, the display as illustrated in FIG. 7 provides a simple manner of determining that either the conveyor is ready for operation or ready for service. If one LED is not extinguished/illuminated—depending on the desired mode of operation, it is easy detectable, and the proper action may be carried out in order to provide the desired feed-back to the control box such that the light may be illuminated/extinguished as the case should be.

In embodiments, the system is furthermore provided with a test button 108, so that it may be tested that all lights are in working order. Furthermore, in this particular embodiment a "release net" button 110 is provided. In some instances, it may be desirable to consciously release the net/barrier.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A safety system comprising a number of sensors connected to a control box, where a status of the system is displayed on the control box by a plurality of indicators in two categories, where the system has three modes, wherein in a first mode all indicators of the plurality of indicators in a first category are "on" indicating that a machine on which the safety system is arranged is in operation mode, a second mode where all indicators of the plurality of indicators in a second category are "on" indicating that the machine on which the safety system is arranged is in service mode and a third mode where all indicators of the plurality of indicators are "off" for both categories indicating that the machine on which the safety system is arranged is not being tested by the safety system.

2. The safety system according to claim 1, wherein the safety system is mounted on an apparatus and where one or more of the sensors are connected to one or more legs, where one or more legs are configured to be in a non-active position not supporting the apparatus or in an active position supporting the apparatus, where when the one or more legs is in the active position a corresponding indicator on the control box indicates "on" in service mode, and when the one or more legs are in the active position a corresponding indicator on the control box indicates "on" in operation mode.

3. The safety system according to claim 2, wherein each of the one or more legs is provided with separate sensors of the number of sensors, which separate sensors are connected to separate indicators of the plurality of indicators on the control box.

4. The safety system according to claim 1, wherein the safety system is mounted on an apparatus comprising a hydraulic system and where one or more of the sensors are connected to the hydraulic system, where the one or more sensors are adapted to register one or more of the following: hydraulic liquid pressure, status of a hydraulic pump, electrical current on the hydraulic pumps motor; and if one or more of the hydraulic liquid pressure, status of the hydraulic pump and/or electrical current on the hydraulic pumps motor corresponds to a predefined state, an input is generated and forwarded to the control box, where depending on the predefined state one or more indicators of the plurality of indicators are turned "on" either in service mode or operation mode, depending on the predefined state.

5. The safety system according to claim 1, wherein the safety system is mounted on an apparatus and where a safety barrier is provided suspended between the lower periphery of the apparatus and a surface on which the apparatus rests, and where one or more sensors are arranged on one or more points where the safety barrier is fastened to the surface, such that if the safety barrier is disengaged from the fastening to the surface an input is generated and forwarded to the control box.

6. The safety system according to claim 5, wherein if the indicators on the control box relating to the service mode are not all indicating "on", an alarm is generated if a sensor registers and generate an input to the control box that the safety barrier is disengaged from the fastening to the surface.

7. The safety system according to claim 6, wherein an input is generated to the control box when all sensors arranged on points where the safety barrier is fastened to the surface, registers that the barrier is fastened to the surface, whereby an indicator relating to the status of the safety barrier on the control box indicates that in operation mode is on.

8. The safety system according to claim 1, wherein the safety system is mounted on an apparatus, where the apparatus includes one or more extendable members, which extendable members are configured to be in a non-extended position or in an extended position, and where locking means are provided for locking the extendable members in the extended or non-extended position, and where a sensor is provided for each of the locking means, such that an input is generated from each sensor of the locking means transmitted to the control box, where the control box has an indicator for each of the locking means both in the service mode and the operation mode, such that when all sensors of the locking means are on in the service mode, all locking means are engaged with the extendable members, and when all indicators of the plurality of indicators are on in the operation mode all locking means are disengaged from the extendable members.

9. The safety system according to claim 1, wherein one or more sensors are mounted on any powerline supplying power to the machine, such that each of the one or more sensors is connected to the control box and optionally separate indicators of the plurality of indicators on the control box, where when all of the one or more sensors forwards an input to the control box indicate that no power is supplied to the machine, an indicator in the service mode is "on", and when all of the one or more sensors forwards an input to the control box indicate that power is supplied to the machine, an indicator in the operation mode is "on".

10. A method of using the safety system according to claim 1, wherein the safety system comprising a number of sensors connected to a control box, where the status of the system is displayed on the control box by the plurality of indicators in two categories, where the system has three modes, wherein in the first mode all indicators of the plurality of indicators in the first category are "on" indicating that the machine on which the safety system is arranged is in operation mode, the second mode where all indicators of the plurality of indicators in the second category are "on" indicating that the machine on which the safety system is arranged is in service mode and the third mode where all indicators of the plurality of indicators are "off" for both categories indicating that the machine on which the safety system is arranged is not being tested by the safety system, such that when the system in use translates between modes indication means on the control box will indicate the current mode of each sensor.

11. The method according to claim 10, wherein the safety system is mounted on an apparatus, where the apparatus includes one or more extendable members, which extendable members may be in a non-extended position and an extended position, and where locking means are provided for locking the extendable members in the extended or non-extended position, and where a sensor is provided for each of the locking means, such that an input is generated from each sensor of the locking means transmitted to the control box, where the control box has an indicator for each of the locking means both in the service mode and the operation mode, such that when all sensors of the locking means are on in the service mode, all locking means are engaged with the extendable members, and when all indicators of the plurality of indicators are on in the operation mode all locking means are disengaged from the extendable members.

* * * * *